United States Patent
Lin et al.

(10) Patent No.: US 6,835,228 B1
(45) Date of Patent: Dec. 28, 2004

(54) PROCESS OF RECOVERING VALUABLE METALS FROM WASTE SECONDARY BATTERIES

(75) Inventors: Jiunn-Ren Lin, Hsinchu (TW); I-Long Chang, Hsinchu (TW); Yu-Lin Jiang, Hsinchu (TW); Jer-Yuan Shiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/715,356

(22) Filed: Nov. 19, 2003

(51) Int. Cl.⁷ ............................................. C25C 1/08
(52) U.S. Cl. ..................... 75/420; 205/583; 205/587; 423/21.1; 423/100; 423/106; 423/127; 423/144; 423/186; 423/421; 429/29
(58) Field of Search ................... 75/420; 205/583, 205/587; 423/21.1, 100, 106, 127, 144, 186, 421, 29

(56) References Cited

U.S. PATENT DOCUMENTS 6,514,311 B1 * 2/2003 Lin et al. ...................... 75/424

* cited by examiner

*Primary Examiner*—Melvyn Andrews
(74) *Attorney, Agent, or Firm*—Bacon & Thomas

(57) ABSTRACT

A process of recovering metals from waste lithium ion/Ni—H/Ni—Cd batteries, wherein the waste batteries are calcined and sieved to generate an ash containing metals and metal oxides. The process includes subjecting the ash to a first dissolution etching treatment, a first filtration treatment to obtain a filtrate containing Cd ions which are crystallized as cadmium sulfate, a second dissolution etching treatment for the filtered solid, and a second filtration treatment to obtain a second filtrate. $Fe^{+3}$, $Al^{+3}$ and rare earth metal ions in the second filtrate are precipitated as hydroxides by adding a base to the second filtrate. The remaining solution was extracted and counter-extracted to obtain aqueous solutions of Co and Ni ions, which were subjected separately to a electrolysis to deposit Co and Ni metals. Li ions in the residue solution from the electrolysis of Ni was precipitated as carbonate by adding a soluble carbonate salt.

7 Claims, 1 Drawing Sheet

PROCESS OF RECOVERING VALUABLE METALS FROM WASTE SECONDARY BATTERIES

FIELD OF THE INVENTION

The present invention relates to a process for recovering valuable metals from mixed waste secondary batteries including Li ion/Ni—H/Ni—Cd secondary batteries.

BACKGROUND OF THE INVENTION

Due to its merits, such as a high electrical energy density, a high working voltage, a long cyclic life and no memory effect, etc., the lithium ion battery has been recognized as a battery system with a high potential for development. Currently, in addition to being widely used in various 3C products, the lithium ion battery is expected to replace batteries of lead acid, Ni—Cd and Ni—H, etc. and becomes a power source for electric cars. However, Ni—Cd and Ni—H secondary batteries are still being used in certain applications, and thus they stilled can be found in the waste secondary batteries recycled. Therefore, there is a need to develop an efficient process for recovering valuable metals from mixed waste secondary batteries.

U.S. Pat. No. 6,514,311 discloses a process for recovering metals from waste lithium ion batteries, wherein the waste batteries are calcined and sieved to generate an ash containing metals and metal oxides. The invented process includes subjecting the ash to a dissolution etching treatment, and a filtration treatment, and separately using a membrane electrolysis method to separate out metal copper and cobalt, wherein the acid generated on the cathode side in the electrolysis process can be recovered through a diffusion dialysis treatment. After electrolysis, the solution rich in lithium ion, after precipitating the metal impurities by adjusting the pH value, can be added with a carbonate ion to form a lithium carbonate. The disclosure of this patent is incorporated herein by reference.

SUMMARY OF THE INVENTION

The present invention discloses a process for recovering valuable metals from waste secondary batteries comprising lithium ion batteries, Ni—H batteries and Ni—Cd batteries, wherein said waste secondary batteries are calcined and sieved to generate an ash containing metals and metal oxides. Said process comprises the following steps:

a) dissolving said ash with a 2N–6N sulfuric acid aqueous solution;

b) adding an alkali to the resulting solution from step a) so that cadmium (Cd) ions and rare earth metal ions contained in the solution precipitate;

c) performing a solid/liquid separation on the resulting mixture from step b);

d) extracting the resulting solution from the separation in step c) with a first organic extractant to form an aqueous layer containing nickel (Ni) ions and cobalt (Co) ions and an organic layer rich in Cd, iron (Fe) and zinc (Zn) ions;

e) extracting the aqueous layer from step d) with a second organic extractant to form an organic layer rich in Co ions and an aqueous layer rich in Ni ions;

f) counter extracting the organic layer rich in Co ions from step e) with a sulfuric acid aqueous solution to obtain an aqueous layer rich in Co ions;

g) using the aqueous layer rich in Ni ions formed in step e) as an electrolysis solution, and using a voltage of 1.5–4.0 volts to perform an electrolysis, thereby forming by reduction a Ni metal on a cathode in said electrolysis;

h) using the aqueous layer rich in Co ions formed in step f) as an electrolysis solution, and using a voltage of 1.5–4.0 volts to perform an electrolysis, thereby forming by reduction a Co metal on a cathode in said electrolysis;

i) adding a water soluble carbonate to a residue solution after the electrolysis in step g), thereby forming a precipitation of lithium carbonate.

Preferably, steps a) and b) together comprises the following steps:

a1) dissolving said ash with a 2N–6N sulfuric acid aqueous solution;

a2) performing a solid/liquid separation on the resulting mixture from step a1);

a3) dissolving the solid resulting from the separation in step a2) with a 4N–12N sulfuric acid aqueous solution;

b1) evaporating water from the resulting solution from the separation in step a2), so that a precipitate containing cadmium sulfate as a major portion thereof is formed therein;

b2) adding an alkali to the resulting solution from the dissolution in step a3), so that a precipitate containing a hydroxides of rare earth metal, $Fe(OH)_3$ and $Al(OH)_3$ as a major portion thereof is formed therein;

wherein the mixture formed in step b2) is subjected to the solid/liquid separation in step c).

Preferably, the precipitate formed in step b1) contains 85% cadmium sulfate by weight of the precipitate.

Preferably, aid alkali used in step b2) is sodium hydroxide and said sodium hydroxide added in step b2) is in an amount so that the solution has a pH value of about 6.

Preferably, the mixture formed in step b1) is subjected to a solid/liquid separation, and the resulting liquid is used as a portion of the 4N–12N sulfuric acid aqueous solution used in step a3).

Preferably, said water soluble carbonate in step i) is sodium carbonate.

Preferably, the process of the present invention further comprises counter extracting the organic layer rich in Cd, Fe and Zn ions with a sulfuric acid aqueous solution to obtain an aqueous layer rich in Cd, Fe and Zn ions; and removing said Cd, Fe and Zn ions from said aqueous layer rich in Cd, Fe and Zn ions by using an ion exchange resin.

Preferably, the process according to the present invention further comprises smashing said calcined product, and collecting the smashed product passing through a screen of 20–5 mesh during smashing. More preferably, the process according to the present invention further comprises separating said smashed product with a screen of 10–5 mesh, thereby obtaining an under size portion containing the ash containing metals and metal oxides, and a portion remained on the screen.

Preferably, the process according to the present invention further comprises separating iron from the portion remained on the screen by a magnetic selection process. More preferably, the process according to the present invention further comprises separating copper and aluminum from the residue generated after the magnetic selection by an eddy current selection process.

The process of the present invention provide a comprehensive recovery of valuable metals from the mixed wasted Li ion/Ni—H/Cd—Ni secondary batteries by incorporating an effective physical selection method and a chemical purification system adapted to the metals contained in the mixed waste secondary batteries, whereby the recovery and purity of the metals recovered are enhanced.

DETAILED DESCRIPTION OF THE PRESENT INVENTION

Figure 1:
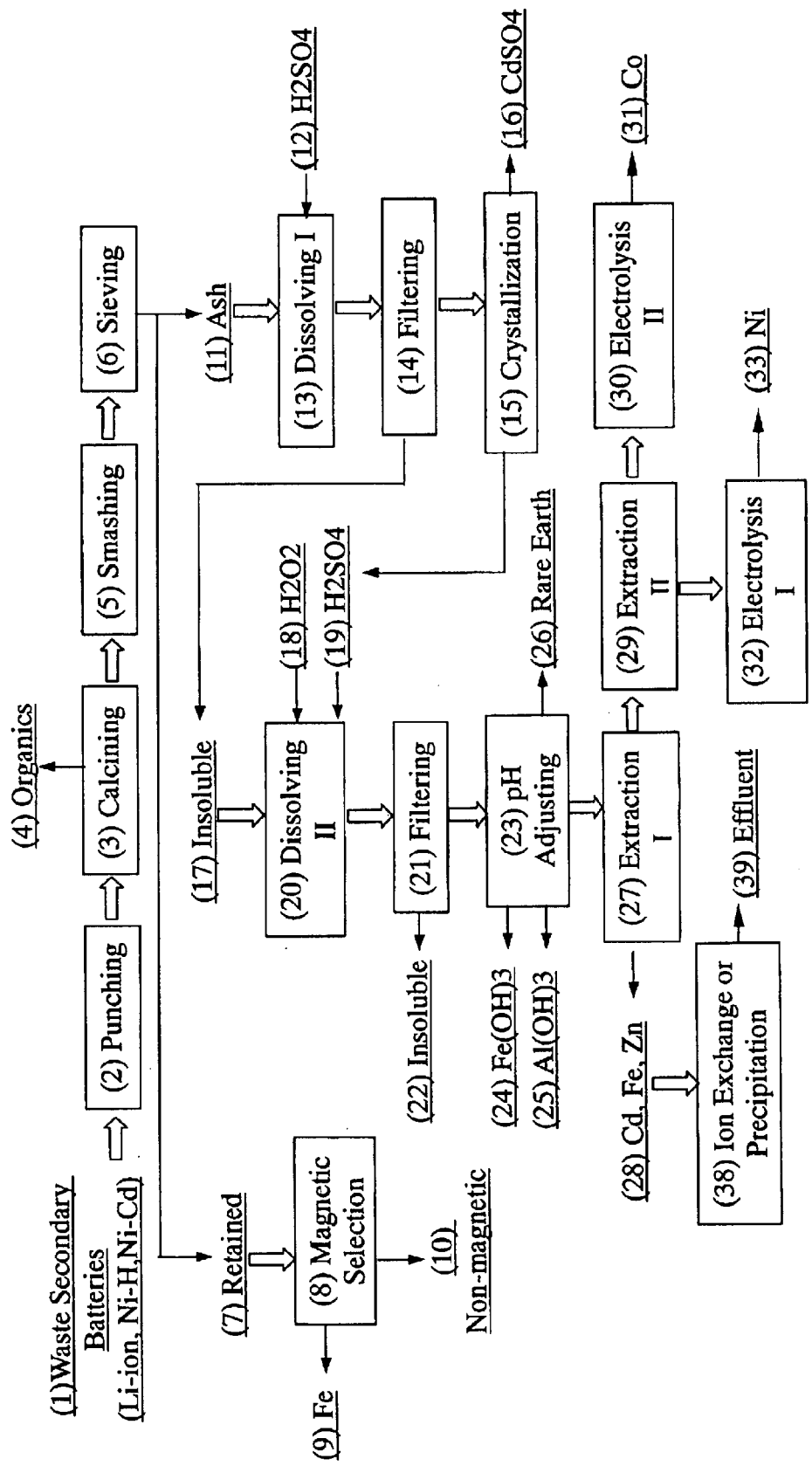
FIG. 1 is a flow chart block diagram of a preferred embodiment of a process according to the present invention.

Heretofore, the known methods for recovering metals from waste secondary batteries are all limited to a specific type of secondary battery and are not suitable for recovering metals from mixed waste secondary batteries. Since it is almost impossible to economically separating the recycled mixed waste secondary batteries into different types of waste secondary batteries without an error, the present invention provides a recovery process for mixed waste secondary batteries of different types.

At present, commercial secondary batteries including lithium ion/NI—H/Ni—Cd batteries, according to their characteristics of applications, mainly can be divided into a cylindrical type and a square type. However, regardless of their configuration, most of them are made by coating an active material for use as a positive electrode on an aluminum foil or Ni alloy foil as a positive electrode plate, coating a carbon material or metal alloy on a copper foil as a negative electrode plate, inserting a barrier membrane between the two plates, filling the space with an electrolyte solution, winding and compressing the composite to a desired specification, installing a conductive stem, a release safety valve and an end cover, etc., sealing the battery with an iron or aluminum can body, and encasing the battery with a plastic enclosure. Therefore, the elements involved in the processing of a waste secondary battery include metals of iron, cobalt, nickel, cadmium, aluminum, copper, lithium and rare earth metals, and non-metal materials, such as plastics, carbon materials and graphite.

The process according to the present invention uses the advantages of a physical selection method and a chemical dissolution purification method, and incorporate an extraction-counter extraction to completely re-source mixed waste secondary batteries. The process according to the present invention is explained together with the flowchart shown in FIG. 1. First, in order to avoid the danger of explosion caused by an excessive internal pressure of a secondary battery during the calcination process, mixed waste secondary batteries of lithium ion/Ni—H/Cd—Ni batteries (1) (or defective products from the production processes) was punched and dried (2). The batteries then were put into a high temperature furnace to be calcined at 250° C.–350° C. for 60–240 minutes (3). The calcination temperature is preferably not higher than 350° C. to avoid sublimation of cadmium. The organic materials (4) in the battery were decomposed by the high temperature and formed carbon dioxide or carbon monoxide, etc.

Meanwhile, a coke could also deposit in the battery. During which, a portion of the metal oxides in the battery could be reduced into metal. The waste secondary batteries, after calcining, were then fed into a smashing system (5). Said smashing system used a screen with 5–20 mesh to output the smashed scraps. Wherein copper foils, aluminum foils and iron/aluminum enclosure, due to their better ductility, had a larger particle size after smashing. The metal oxides and the carbon material were nearly all smashed into a powder. A vibration sieve (6) with an appropriate mesh (preferably larger than 5–200 mesh) was used to separate the smashed mixture into a retained portion (7) including metal scraps, such as copper foils, aluminum foils and iron enclosure, etc., and an under sieve portion (11) of an ash material, including the metals oxides from the metals contained in secondary batteries.

The retained portion (7) was separated into a magnetic material (9) and a non-magnetic material (10) by a magnetic selection (8) means with a magnetic filed of 500–1500G. Said magnetic material mainly comprised iron scraps (9). Said non-magnetic material (10) was separated into metal aluminum and metal copper by an eddy current selection.

Said under sieve portion (11) was subjected to two stages of dissolution, wherein a first stage of dissolution (13) was conducted by adding said under sieve portion (11) to 2–6 N sulfuric acid aqueous solution (12) with a liquid-solid ratio of 5–20. The purpose of the first stage of dissolution is to dissolve Cd metal. The mixture from the first stage of dissolution was filtered (14) to form a solid portion (17) and a filtrate. The solid portion (17) was subjected to a second stage of dissolution (20). The filtrate was treated with an ion exchange resin to remove alkali metal ions and alkaline earth metal ions from the filtrate, and evaporate water from the treated filtrate at 80° C. so that Cd ions therein crystallized (15) out as cadmium sulfate (16). The cadmium sulfate (16) was recovered by filtration, and the concentrated filtrate was combined with a sulfuric acid aqueous solution (19) used in the second stage of dissolution (20).

In the second stage of dissolution (20), metals of Ni and Co, etc. were dissolved from the solid portion (17), preferably by mixing with a sulfuric acid aqueous solution (19) of 4–12 N in a liquid-solid ratio of 5–20, and more preferably with an additional addition of a hydrogen peroxide aqueous solution (18) to enhance the dissolution ability. Subsequently, a filtration facility (21) was used to filter out the insoluble carbon material (22). Due to the addition of hydrogen peroxide (an oxidant), Fe and Al ions in the filtrate had a valence of three, which precipitated out as $Fe(OH)_3$ (24) and $Al(OH)_3$ (25) easily by adjusting the pH value of the filtrate to 3 or above, so that the filtrate after a pH value adjustment step (23) had very low concentrations of Fe and Al ions. Other rare earth metal ions also precipitate out as salts (26) at a relatively lower pH value during the pH value adjustment step (23), so that the resulting rare earth metal salts (26) were able to be recovered separately and in advance of the recovery of $Fe(OH)_3$ (24) and $Al(OH)_3$ (25). Preferably, the pH value is adjusted by adding NaOH, which can form sodium sulfate useful in the following electrolysis for recovering Ni and Co metals. After filtering out the precipitation of $Fe(OH)_3$, $Al(OH)_3$ and rare earth metal salts, the filtrate, which was free of a major portion of the Fe and Al ions and was rich in Ni and Co ions, was subjected to a first stage of extraction (27).

The first stage extraction (27) was able to remove metallic impurities (28) such as Cd, Fe, Zn and Mn from the filtrate rich in Ni and Co ions, which was conducted by using an alkyl or aryl substituted phosphoric acid such as di-2-ethylhexylphosphoric acid (D2EHPA) (available from DAIHACHI Corp., Japan) having a concentration of 20–40% as an extractant and at a pH value of 0–4. After the first stage of extraction (27), an aqueous layer rich in Ni and Co ions and an organic layer containing Cd, Fe, Zn and Mn ions were formed. The aqueous layer rich in Ni and Co ions was subjected to a second stage extraction (29) to form an aqueous layer rich in Ni ions and an organic layer rich in Co ions, wherein an alkyl or aryl substituted phosphoric acid, an alkyl or aryl substituted phosphonic acid, an alkyl or aryl substituted phosphinic acid or an alkyl or aryl substituted pyrophosphoric acid having a concentration of 20–40% in kerosene was used as an extractant, for example D2EHPA, bis-2-ethylhexyl phosphonic acid (PC88A™, DAIHACHI Corp.) and bis(2,4,4-trimethylphenyl)phosphinic acid (Cyanex272™, CYANAMID Corp), and the extraction was conducted at a pH value of 3–9. The organic layer rich in Co ions was counter extracted with a sulfuric acid aqueous solution of 0.4–2.0 N to obtain an aqueous layer rich in Co ions.

The aqueous solution rich in Ni ions resulting from the first stage extraction (27) and the aqueous solution rich in Co ions resulting from the counter extraction were subjected to electrolysis separately after the pH values of these two solutions had been adjusted to 2–7. The electrolysis (32) to deposit Ni metal (33) on the cathode and the electrolysis (30) to deposit Co metal (31) on the cathode were conducted with the conditions listed in the following table:

| Metal | Electrolyte Composition (g/L) | Current Density (mA/cm²) | Voltage (V) | Temperature (° C.) | Current Efficiency (%) |
|---|---|---|---|---|---|
| Co | Cobalt sulfate (150–200) Sodium sulfate (100–150) NaCl (15–20) Boric acid (10–30) | 15–20 | 1.5–4.0 | 60 | About 80 |
| Ni | Nickle sulfate (150–200) NaCl (15–20) Boric acid (10–30) | 15–20 | 1.5–4.0 | 60 | About 98 |

After the electrolysis (32) for the recovery of Ni metal, the residue solution was rich in Li ions, which were precipitated as lithium carbonate by adding a water soluble carbonate to the residue solution.

The organic layer containing the metallic impurities (28) including Cd, Fe, Zn and Mn ions from the first stage extraction (27) was counter extracted with a sulfuric acid or a HCl aqueous solution of 0.2–1.0 N, and the resulting aqueous layer was treated with an ion exchange resin or subjected to a precipitation treatment (38) to remove the metallic impurities (28) before it was expelled (39).

EXAMPLE

Lithium ion batteries, Ni—H batteries and Cd—Ni batteries 1 kg each were mixed, the compositions of which were listed in Table 1. The non-metallic portions in Table 1 mainly are composed of plastic packing, carbon materials, anionic ligands of the metal-containing compounds, organic materials and water.

TABLE 1

Contents of the secondary batteries

| Metal | Lithium ion | Ni—H | Cd—Ni |
|---|---|---|---|
| Cd | 0 | 0 | 200.1 |
| Co | 199.3 | 23.6 | 17.4 |
| Li | 22.6 | 0 | 0 |
| Cu | 65.4 | 0 | 0 |
| Al | 52.2 | 4.4 | 0 |

TABLE 1-continued

Contents of the secondary batteries

| Metal | Lithium ion | Ni—H | Cd—Ni |
|---|---|---|---|
| Fe | 214.4 | 205.2 | 304.4 |
| Mn | 0.7 | 25.2 | 0 |
| Ni | 7.0 | 244.3 | 152.4 |
| Zn | 0 | 2.8 | 0 |
| Rare earth | 0 | 87.8 | 0 |
| Non-metallic portion | 438.4 | 406.7 | 325.7 |

In order to avoid the danger of explosion caused by an excessive internal pressure in the battery, the mixed secondary batteries were punched before they were calcined at 350° C. for four hours. During the calcinations some of the organic materials were decomposed and evaporated, and water was also vaporized, which caused 426 g weight loss. The waste secondary batteries, after calcination, were then fed into a smashing system. Said smashing system used a screen with 5 mesh to output the smashed scraps. A vibration sieve with 20 mesh was used to separate the smashed mixture into a retained portion of 1096 g and an under sieve portion of 1420 g. The weigh loss during the smashing and the sieving was 58 g. The major components contained in the retained portion and the under sieve portion are listed in Table 2.

TABLE 2

| Metal | The retained portion | The under sieve portion |
|---|---|---|
| Cd | 12.76 | 161.55 |
| Co | 20.23 | 193.15 |
| Li | 7.17 | 14.98 |
| Cu | 58.67 | 4.43 |
| Al | 49.02 | 5.49 |
| Fe | 652.16 | 26.69 |
| Mn | 3.39 | 23.45 |
| Ni | 73.14 | 272.61 |
| Zn | 0.14 | 2.32 |
| Nd | 0 | 40.80 |
| La | 0 | 45.15 |
| Non-metallic portion | 219.25 | 629.40 |

The retained portion was separated into a magnetic material of 780 g and a non-magnetic material of 296 g by a magnetic selection means with a magnetic filed of 1100G. Said magnetic material mainly was iron scraps and comprised 80% of iron. Said non-magnetic material comprised 54% of carbon material, 18.7% of copper foil and 15.5% of aluminum foil. The copper/aluminum foils was separated from the carbon material by gravity selection. The aluminum foil and the copper foil were separated by an eddy current selection.

The under sieve portion was dissolved with 9 L of 1 M sulfuric acid aqueous solution for 10 minutes (the first stage dissolution). The dissolution ratios of the metals contained in the under sieve portion are listed in Table 3. The resulting solution rich in Cd ions, after filtration, was introduced into an ion exchange resin column to remove alkali metal ions and alkaline earth metal ions, and the remaining Cd ions in the solution were crystallized by evaporating water from the solution at 80° C. to form a cadmium sulfate crystal with a purity higher than 95% and a concentrated sulfuric acid solution having a volume which was about 40% of that of the original solution. The solid portion filtered out from the dissolution mixture was added into a mixture of 6 L of 4 M sulfuric acid aqueous solution and 0.5 L of 3% hydrogen peroxide aqueous solution to dissolve metals contained therein (the second stage dissolution). The dissolution ratios of the metals contained in the solid portion are listed in Table 3. After one hour, a filtration facility was used to remove the insolubles in said mixture. To the filtrate NaOH was added until the pH thereof was increased to 2, so that rare earth metal ions in the filtrate formed a precipitate of hydroxides, and the precipitates was removed by filtration. Again, to the filtrate NaOH was added until the pH thereof was increased to 6, whereby a portion of the Fe ions (20%) and most of the Al ions (99%) in the filtrate formed $Fe(OH)_3$ and $Al(OH)_3$ precipitates. The $Fe(OH)_3$ and $Al(OH)_3$ precipitates were removed by filtration, the resulting filtrate having a pH of 6 was adjusted to have a pH of 3 and then subjected to a first stage extraction.

TABLE 3

| Metal | Dissolution ratio at $1^{st}$ stage | Dissolution ratio at $2^{nd}$ stage |
|---|---|---|
| Cd | 93.36% | 100.00% |
| Co | 8.11% | 93.16% |
| Li | 27.84% | 100.00% |
| Cu | 7.45% | 2.03% |
| Al | 44.37% | 81.25% |
| Fe | 14.40% | 72.09% |
| Mn | 46.24% | 74.00% |
| Ni | 5.56% | 88.82% |
| Zn | 49.30% | 20.93% |
| La | 10.19% | 93.56% |
| Nd | 10.06% | 100.00% |

The first stage extraction was conducted by using D2EHPA having a concentration of 25% in kerosene and a ratio of organic phase to aqueous phase of 1, thereby forming an organic layer containing Cd, Fe, Zn and Mn ions and an aqueous layer rich in Ni and Co ions. After decantation, the aqueous layer was adjusted to have a pH of 6.7, and then subjected to a second stage extraction by using Cyanex272™ having a concentration of 0.5 M in kerosene and a ratio of organic phase to aqueous phase of 1, thereby forming an organic layer rich in Co ions and an aqueous layer rich in Ni ions. After decantation, the organic layer rich in Co ions was counter extracted with a sulfuric acid aqueous solution of 0.5 M to obtain a sulfuric acid aqueous solution rich in Co ions (aqueous layer). The metal contents in the aqueous layer rich in Ni ions and the sulfuric acid aqueous solution rich in Co ions are listed in Table 4.

TABLE 4

| Metal | Aqueous solution containing Co ions (%) | Aqueous layer rich in Ni ions (%) |
|---|---|---|
| Cd | 1.3 | 0.3 |
| Co | 94.4 | 1.3 |
| Fe | 1.3 | 0 |
| Mn | 0.9 | 0 |
| Ni | 2.1 | 98.4 |

The aqueous solution rich in Ni ions and the aqueous solution rich in Co ions obtained above were added with 2% boric acid separately, and then were subjected to an electrolysis by using a voltage of 3.5 V, where the pH values thereof were controlled at 4 or above. In order to enhance the current efficiency, the electrolysis was stopped when the concentrations of Ni ions and Co ions in the aqueous solutions were lower than 500 ppm, and the solutions were introduced into a fluidized electrolysis bath for further electrolysis, thereby substantially all the Ni and Co ions were recovered as metals. The Ni metal recovered was about 204 g and the Co metal recovered was about 154 g in this example.

What is claimed is:

1. A process for recovering valuable metals from waste secondary batteries comprising lithium ion batteries, Ni—H batteries and Ni—Cd batteries, wherein said waste secondary batteries are calcined and sieved to generate an ash containing metals and metal oxides, said process comprising the following steps:

a) dissolving said ash with a 2N–6N sulfuric acid aqueous solution;

b) adding an alkali to the resulting solution from step a) so that cadmium (Cd) ions and rare earth metal ions contained in the solution precipitate;

c) performing a solid/liquid separation on the resulting mixture from step b);

d) extracting the resulting solution from the separation in step c) with a first organic extractant to form an aqueous layer containing nickel (Ni) ions and cobalt (Co) ions and an organic layer rich in Cd, iron (Fe) and zinc (Zn) ions;

e) extracting the aqueous layer from step d) with a second organic extractant to form an organic layer rich in Co ions and an aqueous layer rich in Ni ions;

f) counter extracting the organic layer rich in Co ions from step e) with a sulfuric acid aqueous solution to obtain an aqueous layer rich in Co ions;

g) using the aqueous layer rich in Ni ions formed in step e) as an electrolysis solution, and using a voltage of 1.5–4.0 volts to perform an electrolysis, thereby forming by reduction a Ni metal on a cathode in said electrolysis;

h) using the aqueous layer rich in Co ions formed in step f) as an electrolysis solution, and using a voltage of 1.5–4.0 volts to perform an electrolysis, thereby forming by reduction a Co metal on a cathode in said electrolysis;

i) adding a water soluble carbonate to a residue solution after the electrolysis in step g), thereby forming a precipitation of lithium carbonate.

2. The process according to claim 1, wherein steps a) and b) together comprises the following steps:

a1) dissolving said ash with a 2N–6N sulfuric acid aqueous solution;

a2) performing a solid/liquid separation on the resulting mixture from step a1);

a3) dissolving the solid resulting from the separation in step a2) with a 4N–12N sulfuric acid aqueous solution;

b1) evaporating water from the resulting solution from the resulting solution from the separation in step a2), so that a precipitate containing cadmium sulfate as a major portion thereof is formed therein;

b2) adding an alkali to the resulting solution from the dissolution in step a3), so that a precipitate containing a hydroxides of rare earth metal, $Fe(OH)_3$ and $Al(OH)_3$ as a major portion thereof is formed therein;

wherein the mixture formed in step b2) is subjected to the solid/liquid separation in step c).

3. The process according to claim 2, wherein the precipitate formed in step b1) contains 85% cadmium sulfate by weight of the precipitate.

4. The process according to claim 2, wherein aid alkali used in step b2) is sodium hydroxide and said sodium hydroxide added in step b2) is in an amount so that the solution has a pH value of about 6.

5. The process according to claim 2, wherein the mixture formed in step b1) is subjected to a solid/liquid separation, and the resulting liquid is used as a portion of the 4N–12N sulfuric acid aqueous solution used in step a3).

6. The process according to claim 1, wherein said water soluble carbonate in step i) is sodium carbonate.

7. The process according to claim 1 further comprising counter extracting the organic layer rich in Cd, Fe and Zn ions with a sulfuric acid aqueous solution to obtain an aqueous layer rich in Cd, Fe and Zn ions; and removing said Cd, Fe and Zn ions from said aqueous layer rich in Cd, Fe and Zn ions by using an ion exchange resin.

* * * * *